United States Patent
Xue et al.

(10) Patent No.: US 12,335,960 B2
(45) Date of Patent: Jun. 17, 2025

(54) SOFT GRANT FOR RESOURCE POOL SHARING IN NEW RADIO (NR) SIDELINK

(71) Applicant: QUALCOMM Incorporated, San Diego, CA (US)

(72) Inventors: Yisheng Xue, San Diego, CA (US); Xiaoxia Zhang, San Diego, CA (US); Chih-Hao Liu, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 795 days.

(21) Appl. No.: 17/450,019

(22) Filed: Oct. 5, 2021

(65) Prior Publication Data

US 2023/0105811 A1 Apr. 6, 2023

(51) Int. Cl.
*H04W 72/23* (2023.01)
*H04W 72/20* (2023.01)

(52) U.S. Cl.
CPC ........... *H04W 72/23* (2023.01); *H04W 72/20* (2023.01)

(58) Field of Classification Search
None
See application file for complete search history.

(56) References Cited

U.S. PATENT DOCUMENTS

| | | | |
|---|---|---|---|
| 11,871,314 B2 * | 1/2024 | Kim | H04L 5/10 |
| 2017/0171882 A1 | 6/2017 | Sundararajan et al. | |
| 2019/0090218 A1 * | 3/2019 | Noh | H04W 72/51 |
| 2019/0254059 A1 * | 8/2019 | Gulati | H04W 72/542 |
| 2020/0305169 A1 * | 9/2020 | Loehr | H04W 4/40 |
| 2020/0314915 A1 * | 10/2020 | Lin | H04W 74/0833 |
| 2021/0045093 A1 * | 2/2021 | Rao | H04W 76/14 |
| 2021/0051653 A1 * | 2/2021 | Park | H04W 8/22 |
| 2021/0051681 A1 * | 2/2021 | Manolakos | H04L 1/0031 |
| 2021/0068125 A1 * | 3/2021 | Lin | H04W 76/14 |
| 2021/0282055 A1 * | 9/2021 | Xu | H04W 28/22 |
| 2021/0409993 A1 * | 12/2021 | Fakoorian | H04B 17/24 |
| 2022/0248176 A1 * | 8/2022 | Hwang | H04W 92/18 |
| 2022/0279500 A1 * | 9/2022 | Hosseini | H04W 76/14 |
| 2022/0287072 A1 * | 9/2022 | Xue | H04W 72/0446 |

(Continued)

FOREIGN PATENT DOCUMENTS

| | | | |
|---|---|---|---|
| CN | 111083732 A * | 4/2020 | H04L 47/32 |
| KR | 20210042930 A * | 4/2021 | |

(Continued)

*Primary Examiner* — Andrew C Oh
(74) *Attorney, Agent, or Firm* — Norton Rose Fulbright US LLP

(57) ABSTRACT

Systems, methods, and devices for wireless communication that support mechanisms for sharing of a sidelink resource pool using soft grants. A sidelink resource pool may be shared between one or more sidelink mode 1 UEs and one or more sidelink mode 2 UEs. A base station may grant one or more sidelink resources to a mode 1 transmitting UE for transmitting data to a mode 1 receiving UE, and may include an indication that at least one of the one or more sidelink resources granted is a soft granted sidelink resource that may be accessed by the mode 1 transmitting UE only after passing re-evaluation. The mode 1 transmitting UE may perform re-evaluation and may transmit over the at least one sidelink resource only if the at least one sidelink resource passes the re-evaluation.

26 Claims, 12 Drawing Sheets

(56) References Cited

U.S. PATENT DOCUMENTS

| | | | |
|---|---|---|---|
| 2022/0312457 A1* | 9/2022 | Wang | H04W 72/1263 |
| 2022/0369357 A1* | 11/2022 | Luo | H04W 72/21 |
| 2022/0377786 A1* | 11/2022 | Xue | H04L 1/1896 |
| 2023/0030144 A1* | 2/2023 | Ibrahim | H04W 72/541 |
| 2023/0050681 A1* | 2/2023 | Zhou | H04W 72/20 |
| 2023/0095046 A1* | 3/2023 | Jiang | H04W 72/541 |
| | | | 370/329 |
| 2023/0171795 A1* | 6/2023 | Di Girolamo | H04W 72/51 |
| | | | 370/329 |
| 2023/0254842 A1* | 8/2023 | Zhou | H04W 72/02 |
| | | | 370/329 |
| 2023/0269010 A1* | 8/2023 | Ma | H04B 17/347 |
| | | | 370/252 |
| 2024/0106575 A1* | 3/2024 | Salim | H04L 1/189 |

FOREIGN PATENT DOCUMENTS

| | | | | |
|---|---|---|---|---|
| WO | WO-2007111266 A1 * | 10/2007 | | H04B 7/0417 |
| WO | WO-2015019045 A1 * | 2/2015 | | H04W 52/0216 |
| WO | WO-2019029814 A1 * | 2/2019 | | H04B 7/063 |
| WO | WO-2020166922 A1 * | 8/2020 | | H04L 1/1812 |
| WO | WO-2021099040 A1 * | 5/2021 | | H04B 7/0695 |
| WO | WO-2021109002 A1 * | 6/2021 | | H04L 5/0005 |
| WO | WO-2021227080 A1 * | 11/2021 | | |
| WO | WO-2022246667 A1 * | 12/2022 | | H04L 1/08 |
| WO | WO-2023027821 A1 * | 3/2023 | | H04W 72/0406 |

\* cited by examiner

SOFT GRANT FOR RESOURCE POOL SHARING IN NEW RADIO (NR) SIDELINK

TECHNICAL FIELD

Aspects of the present disclosure relate generally to wireless communication systems, and more particularly, to sharing a sidelink resource pool using soft grants.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, from a base station, a soft grant of one or more sidelink resources for transmitting a physical sidelink shared channel (PSSCH) transmission to a second UE over a sidelink. In aspects, the soft grant may include an indication that at least one sidelink resource of the one or more sidelink resources is soft-granted, and the UE and the second UE may be operating in sidelink mode 1. The method further includes performing, prior to transmitting over the one or more sidelink resources, a re-evaluation of the at least one sidelink resource to determine whether the soft grant of the at least one sidelink resource collides with a resource reservation of the at least one sidelink resource from another UE operating in sidelink mode 2, and transmitting the PSSCH transmission to the second UE over the at least one sidelink resource in response to a determination, based on the re-evaluation of the at least one sidelink resource, that the soft grant of the at least one resource does not collide with the resource reservation of the at least one sidelink resource from the another UE operating in sidelink mode 2.

In an additional aspect of the disclosure, a method of wireless communication performed by a base station includes configuring a soft grant of one or more sidelink resources for a transmitting UE to transmit a PSSCH transmission to a receiving UE over a sidelink. In aspects, the soft grant may include an indication that at least one sidelink resource of the one or more sidelink resources is soft-granted, and the UE and the second UE may be operating in sidelink mode 1. The method further includes transmitting, to the transmitting UE, the soft grant of the one or more sidelink resources.

In an additional aspect of the disclosure, a UE includes at least one processor and a memory coupled to the at least one processor. The at least one processor stores processor-readable code that, when executed by the at least one processor, is configured to perform operations including receiving, from a base station, a soft grant of one or more sidelink resources for transmitting a PSSCH transmission to a second UE over a sidelink. In aspects, the soft grant may include an indication that at least one sidelink resource of the one or more sidelink resources is soft-granted, and the UE and the second UE may be operating in sidelink mode 1. The operations further include performing, prior to transmitting over the one or more sidelink resources, a re-evaluation of the at least one sidelink resource to determine whether the soft grant of the at least one sidelink resource collides with a resource reservation of the at least one sidelink resource from another UE operating in sidelink mode 2, and transmitting the PSSCH transmission to the second UE over the at least one sidelink resource in response to a determination, based on the re-evaluation of the at least one sidelink resource, that the soft grant of the at least one resource does not collide with the resource reservation of the at least one sidelink resource from the another UE operating in sidelink mode 2.

In an additional aspect of the disclosure, a base station includes at least one processor and a memory coupled to the at least one processor. The at least one processor stores processor-readable code that, when executed by the at least one processor, is configured to perform operations including configuring a soft grant of one or more sidelink resources for a transmitting UE to transmit a PSSCH transmission to a receiving UE over a sidelink. In aspects, the soft grant may include an indication that at least one sidelink resource of the one or more sidelink resources is soft-granted, and the UE and the second UE may be operating in sidelink mode 1. The operations further include transmitting, to the transmitting UE, the soft grant of the one or more sidelink resources.

In an additional aspect of the disclosure, a non-transitory computer-readable medium stores instructions that, when executed by a processor, cause the processor to perform operations. The operations include receiving, by a UE from a base station, a soft grant of one or more sidelink resources for transmitting a PSSCH transmission to a second UE over a sidelink. In aspects, the soft grant may include an indication that at least one sidelink resource of the one or more sidelink resources is soft-granted, and the UE and the second UE may be operating in sidelink mode 1. The operations further include performing, prior to transmitting over the one or more sidelink resources, a re-evaluation of the at least one sidelink resource to determine whether the soft grant of the at least one sidelink resource collides with a resource reservation of the at least one sidelink resource from another UE operating in sidelink mode 2, and transmitting the PSSCH transmission to the second UE over the at least one sidelink resource in response to a determination, based on the re-evaluation of the at least one sidelink resource, that the soft grant of the at least one resource does not collide with the resource reservation of the at least one sidelink resource from the another UE operating in sidelink mode 2.

In an additional aspect of the disclosure, a non-transitory computer-readable medium stores instructions that, when executed by a processor, cause the processor to perform operations. The operations include configuring, by a base station, a soft grant of one or more sidelink resources for a transmitting UE to transmit a PSSCH transmission to a receiving UE over a sidelink. In aspects, the soft grant may include an indication that at least one sidelink resource of the one or more sidelink resources is soft-granted, and the UE and the second UE may be operating in sidelink mode 1. The operations further include transmitting, to the transmitting UE, the soft grant of the one or more sidelink resources.

In an additional aspect of the disclosure, an apparatus includes means for receiving, by a UE from a base station, a soft grant of one or more sidelink resources for transmitting a PSSCH transmission to a second UE over a sidelink. In aspects, the soft grant may include an indication that at least one sidelink resource of the one or more sidelink resources is soft-granted, and the UE and the second UE may be operating in sidelink mode 1. The apparatus further includes means for performing, prior to transmitting over the one or more sidelink resources, a re-evaluation of the at least one sidelink resource to determine whether the soft grant of the at least one sidelink resource collides with a resource reservation of the at least one sidelink resource from another UE operating in sidelink mode 2, and means for transmitting the PSSCH transmission to the second UE over the at least one sidelink resource in response to a determination, based on the re-evaluation of the at least one sidelink resource, that the soft grant of the at least one resource does not collide with the resource reservation of the at least one sidelink resource from the another UE operating in sidelink mode 2.

In an additional aspect of the disclosure, an apparatus includes means for configuring, by a base station, a soft grant of one or more sidelink resources for a transmitting UE to transmit a PSSCH transmission to a receiving UE over a sidelink. In aspects, the soft grant may include an indication that at least one sidelink resource of the one or more sidelink resources is soft-granted, and the UE and the second UE may be operating in sidelink mode 1. The apparatus further includes means for transmitting, to the transmitting UE, the soft grant of the one or more sidelink resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
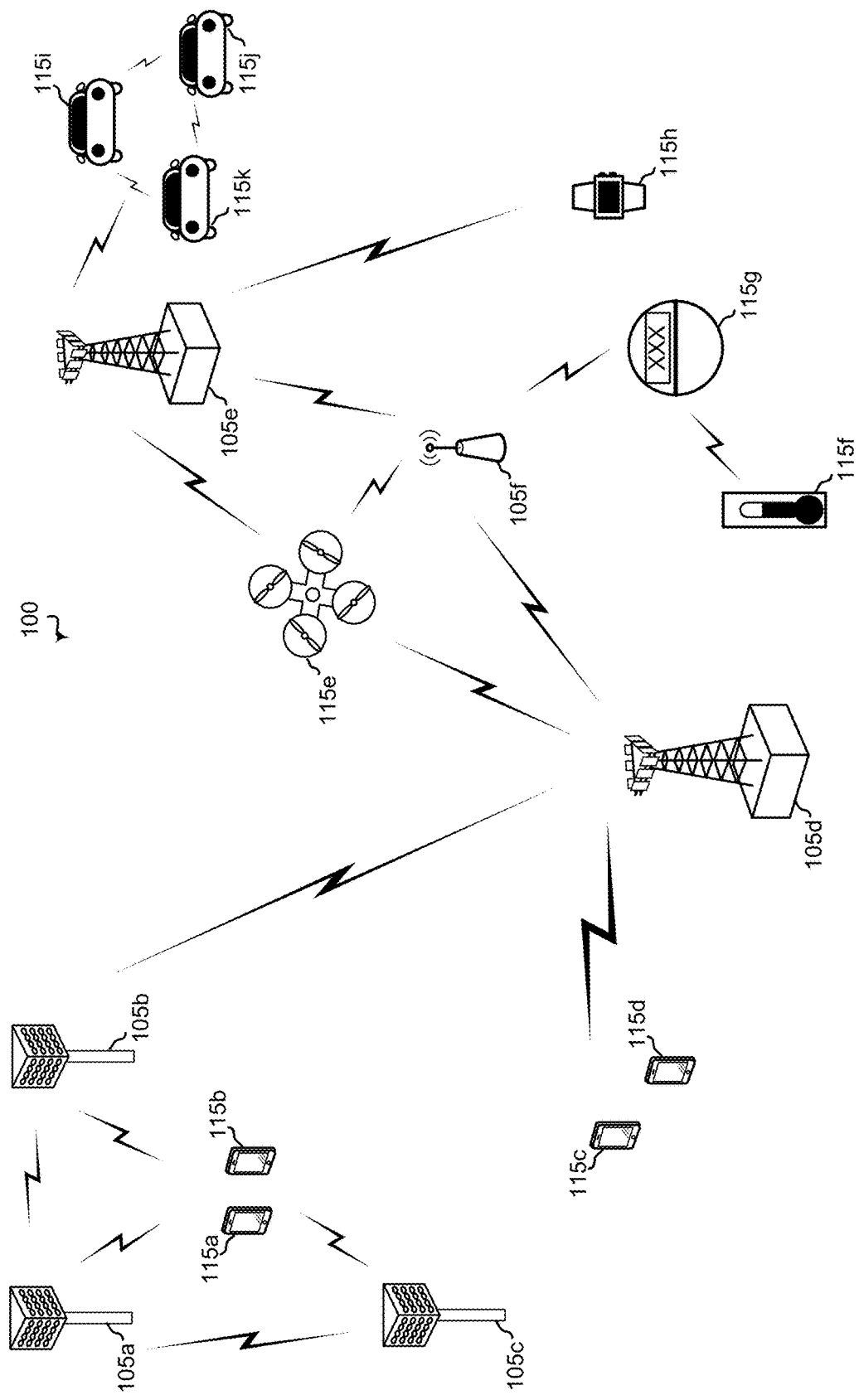
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi- Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
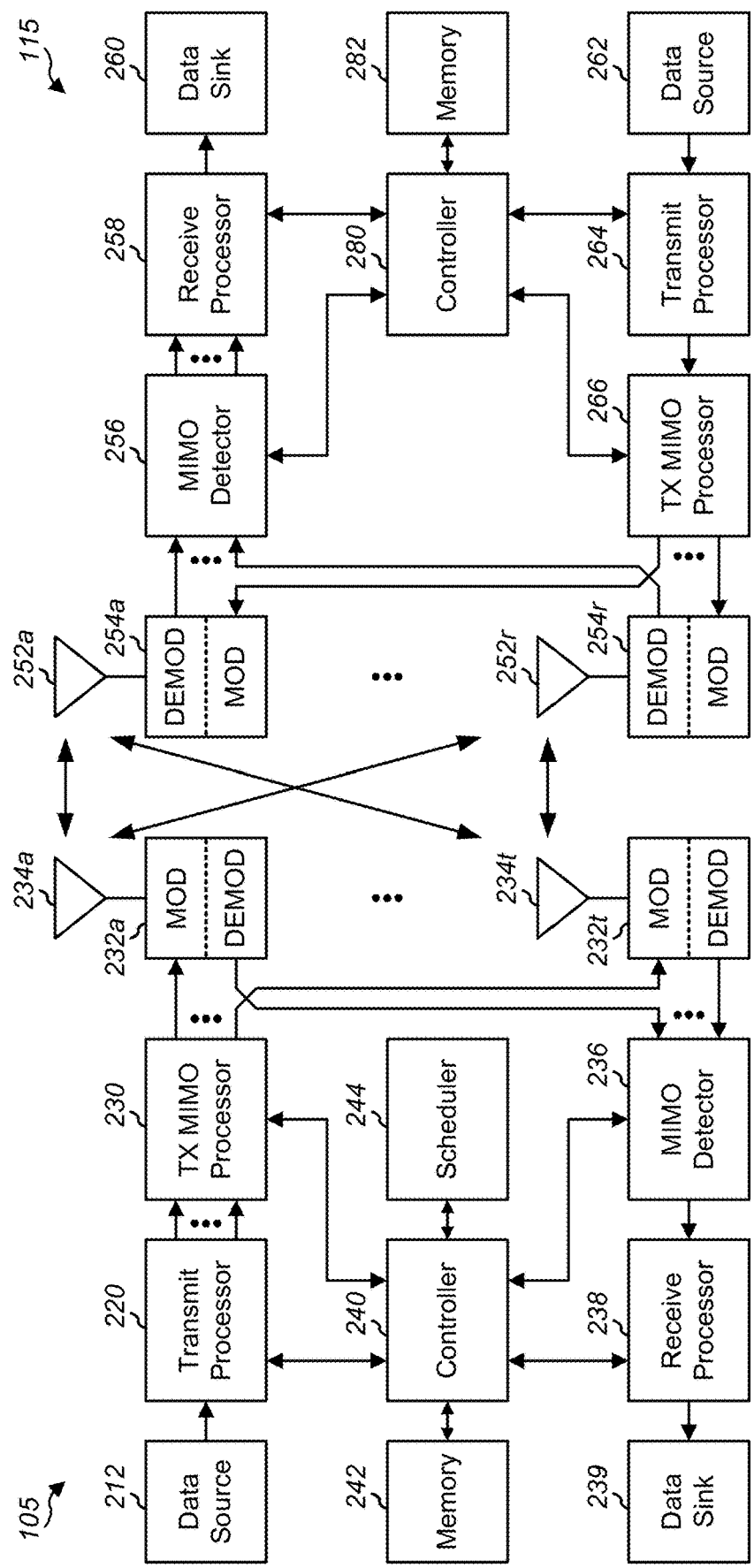
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5 and 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems implement sidelink communications in which a UE communicates with other UEs directly over a sidelink. Sidelink communications may be particularly useful in Internet of Things (IoT) and/or vehicle-to-everything (V2X) application, in which delivering safety related messages in a sub-6 GHz licensed bands is particularly important.

In some implementations, sidelink communications between two UEs may operate in one of various modes. In particular, two modes for channel/resource allocation have been specified in current in 5G NR wireless communication system implementations. One such mode, also known as sidelink mode 2, involves a transmitting node autonomously scheduling sidelink transmissions to a receiving UE(s) over the sidelink without the transmitting UE obtaining a transmission grant from a serving base station before it is allowed to transmit to the receiving UE over the sidelink. In another mode, also known as sidelink mode 1, a base station may schedule the sidelink transmissions between the transmitting UE and the receiving UE(s). For example, in sidelink mode 1, a UE may transmit to another UE over the sidelink, but the transmitting UE must obtain a transmission grant (e.g., in a downlink control information (DCI) message) from the serving base station before it is allowed to transmit to the receiving UE over the sidelink. In sidelink mode 1, without a transmission grant, the transmitting UE is not allowed to transmit to the receiving UE over the sidelink. However, once the base station grants the transmission grant to the transmitting UE, the transmitting UE may transmit to the receiving UE over the sidelink.

In implementations, the sidelink transmission may follow a particular scheme. For example, the transmitting UE may transmit control information in a sidelink control information (SCI) message to the receiving UE. The receiving UE may use the control information in the SCI to receive and/or to decode a data transmission (e.g., a co-subchannel physical sidelink shared channel (PSSCH) transmission) from the transmitting UE. In current implementations, the SCI may be transmitted in a two-stage procedure, which include stage one SCI (SCI-1) and stage two SCI (SCI-2). In SCI-1, which may be transmitted to the receiving UE in a physical sidelink control channel (PSCCH) transmission, the transmitting UE may transmit information that may indicate resource occupancy/reservations for other sidelink UEs, as well as information on how to demodulate the co-subchannel PSSCH transmission and information on how to decode the stage 2 SCI. SCI-1 may also include priority information so that a sidelink UE operating in mode 2, receiving the SCI-1 message, may perform collision avoidance according to what the mode 2 sidelink UE has sensed in a sensing window. In stage 2 SCI, which may be transmitted in the PSSCH transmission (e.g., may be piggybacked onto the co-subchannel PSSCH transmission), the transmitting UE may transmit control information on how to decode and process the PSSCH transmission (e.g., information including level 1 (L1) source ID, level 2 (L2) destination ID, sidelink SL process control, etc.), and information that may not be able to be carried in stage 1 SCI. With the SCI control information, the receiving UE may receive and decode the PSSCH transmission and may determine feedback resources for reporting feedback associated with the PSSCH transmission.

In current sidelink implementations, a mode 2 sidelink UE may be specified to specified to perform initial sensing (e.g., upon arrival of a transport block (TB)) to reserve a sidelink resource, and re-evaluation of the sidelink resource before accessing the sidelink resource. Performing re-evaluation may be beneficial for a mode 2 sidelink UE because in some cases a reserved sidelink resource may be pre-empted by another UE to transmit a higher priority TB. In other cases, multiple sidelink UEs may also reserve the same sidelink resource using the same sidelink priority, and in this case, it may be beneficial for the mode 2 sidelink UE to perform avoidance after sensing a reservation collision.

In implementations, a mode 2 sidelink UE wishing to occupy a sidelink resource for sidelink communication may perform initial sensing of the medium in order to perform sidelink resource selection. At a high-level, initial sensing of a sidelink channel may be performed when resource selection is triggered at time n for a TB. In this case, the physical layer (PHY) of the mode 2 sidelink UE may examine a sensing window in order to identify a set of available candidate sidelink resources in the resource selection window (RSW). A sidelink resource may be detected to be available if the sidelink resource has not been reserved by any SCI-1 message (e.g., an SCI-1 message transmitted from a sidelink UE within the sensing widow) whose demodulation reference signal (DMRS) is stronger than or exceeds a priority-dependent threshold. Within the set of candidate sidelink resources reported by the PHY layer to the medium access control (MAC), one of the candidate sidelink resources may be randomly selected. In some cases, when the size of the candidate sidelink resource set is large enough, the random selection may be able to suppress a collision with another reservation of the same selected sidelink candidate to a reasonable level.

In implementations, the mode 2 sidelink UE may perform re-evaluation of the selected sidelink resource in order to avoid collisions. For example, even when a sidelink resources has been selected (e.g., from the set of available candidate sidelink resources as described above), the mode 2 sidelink UE needs to continuously sense the sidelink channel up to a time $T_3$ before actually accessing (e.g., transmitting or receiving) the selected resource to avoid a collision until the "last minute." During re-evaluation, the MAC layer of the mode 2 sidelink UE may request the PHY layer to report an updated set of available resources. The MAC layer then double checks that the previously chosen resource, denoted as $r_1$, is still available. In addition to the set of available resources, the PHY layer may provide further indications. If $r_1$ is no longer available, the PHY layer may set a re-selection flag to the MAC layer, triggering the MAC layer to re-select a resource from the set of available resources. The re-selection may lead to a new $T_3$ based re-evaluation. If $r_1$ is still available, the mode 2 sidelink UE may access the selected resource.

Furthermore, in current sidelink implementations, resource pool sharing between mode 1 sidelink UEs and mode 2 sidelink UEs may allow coexistence of mode 1 sidelink UEs and mode 2 sidelink UEs within a same resource pool, but with some limitations. For example, in current sidelink implementations, although there is a mechanism for a mode 1 UE to carry reservations (e.g., in the SCI-1), there is no mechanism for reporting sensing results from a mode 1 sidelink UE to a base station for collision avoiding scheduling. Some of the possible reasons that current sidelink implementations do not include a mechanism for reporting sensing results may include that dynamic channel access has been specified as the main engine for 5G NR. In addition, this approach incur tremendous signaling overheads for reporting sensing results.

In addition, priority may play a part in how resource pool-sharing may be implemented in a sidelink implementation. However, currently, there is no mechanism to either prioritize a channel access by a mode 1 sidelink UE (e.g., a sidelink resource reservation by a mode 1 sidelink UE) over a channel access by a mode 2 sidelink UE (e.g., a sidelink resource reservation by a mode 2 sidelink UE), vice-versa, or no prioritization. It is important, however, to consider that sidelink implementations in 5G NR may have to support a much higher area spectral efficiency than for LTE vehicle-to-everything (V2X) and may have to provide better guaranteed performance for high-QoS flows. In this regards, sidelink mode 1 has significant advantage over sidelink mode 2.

Various aspects of the present disclosure are directed to systems and methods that support mechanisms for sharing of a sidelink resource pool using soft grants in a wireless communication system. In aspects, a sidelink resource pool may be shared between one or more sidelink mode 1 UEs and one or more sidelink mode 2 UEs. A base station may grant one or more sidelink resources to a mode 1 transmitting UE for transmitting data (e.g., a PSSCH transmission) to a mode 1 receiving UE. The base station may include an indication that at least one of the one or more sidelink resources granted to the mode 1 transmitting UE is a soft grant. In aspects, a soft granted sidelink resource may be a sidelink resource that may be accessed by the mode 1 transmitting UE only after passing re-evaluation. The mode 1 transmitting UE may perform re-evaluation and may transmit over the at least one sidelink resource only if the at least one sidelink resource passes the re-evaluation. For example, the mode 1 transmitting UE may transmit (e.g., a PSSCH transmission and/or a reservation of remaining granted sidelink resources) over the at least one sidelink resource when the at least one sidelink resource passes the re-evaluation (e.g., when the soft grant of the at least one sidelink resource is determined to not collide with a reservation from a mode 2 UE based on the re-evaluation). On the other hand, the mode 1 transmitting UE may not transmit (e.g., may be blocked from transmitting) over the at least one sidelink resource when the at least one sidelink resource does not pass the re-evaluation (e.g., when the soft grant of the at least one sidelink resource is determined to collide with a reservation from a mode 2 UE based on the re-evaluation).

A soft grant, as used herein, may be different from a legacy grant in that a mode 1 transmitting UE receiving the legacy grant may access (e.g., transmit or receive over) the sidelink resource without having to perform or pass re-evaluation. In aspects, the mode 1 transmitting UE may autonomously upgrade a soft grant to a legacy-like grant by transmitting a resource reservation of the soft granted resources in an SCI message.

In aspects, a soft grant of a sidelink resource may include an indication of a set of multi-opportunities anchored at a single sidelink resource indicated by legacy grant signaling. For example, the mode 1 transmitting UE may receive a soft grant including an indication that the mode 1 transmitting UE is to transmit over any resource in an indicated slot upon re-evaluation. In this manner, the mode 1 transmitting UE may be allowed to transmit in any subchannel within the indicated slot, rather than single subchannel that may be reserved by a mode 2 UE.

In aspects, as noted above, the mode 1 transmitting UE may further reduce the risk of collision for the remaining granted sidelink resources (e.g., legacy granted resources rather than the soft granted resources) by transmitting a resource reservation in an SCI message during access to the soft granted resources that has passed re-evaluation. For example, the mode 1 transmitting UE may receive the grant for the one or more sidelink resources (e.g., sidelink resources a, b, and c), for which the grant for sidelink resource a is a soft grant. The mode 1 transmitting UE may perform re-evaluation of the soft granted resources a. The re-evaluation of resource a may pass, and the mode 1 transmitting UE may transmit a PSSCH transmission to the mode 1 receiving UE over resource a, and may also transmit a reservation in an SCI message reserving resources b and c. The mode 1 transmitting UE may, in this manner, further reduce the risk of collision for resources b and c, and may access resources b and c without performing re-evaluation. In some aspects, when the mode 1 transmitting UE receives a hybrid automatic repeat request (HARQ)-acknowledgement (ACK) from the mode 1 receiving UE for the PSSCH transmission over resource a, the mode 1 transmitting UE may report to the base station that resources b and c are no longer needed by the mode 1 transmitting UE and are thus available for legacy-like grant to other sidelink UEs.

In aspects, the sidelink soft grant mechanism of embodiments allows a system to provide collision suppression and/or avoidance between sidelink mode 1 UEs and sidelink mode 2 UEs. For example, a sidelink mode 1 transmitting UE receiving the soft grant may not access the soft granted resource until and if re-evaluation passes. In this manner, if a sidelink mode 2 UE has selected the same resource to transmit over the sidelink, a collision between the mode 1 transmitting UE and the mode 2 UE may be avoided.

Figure 3:
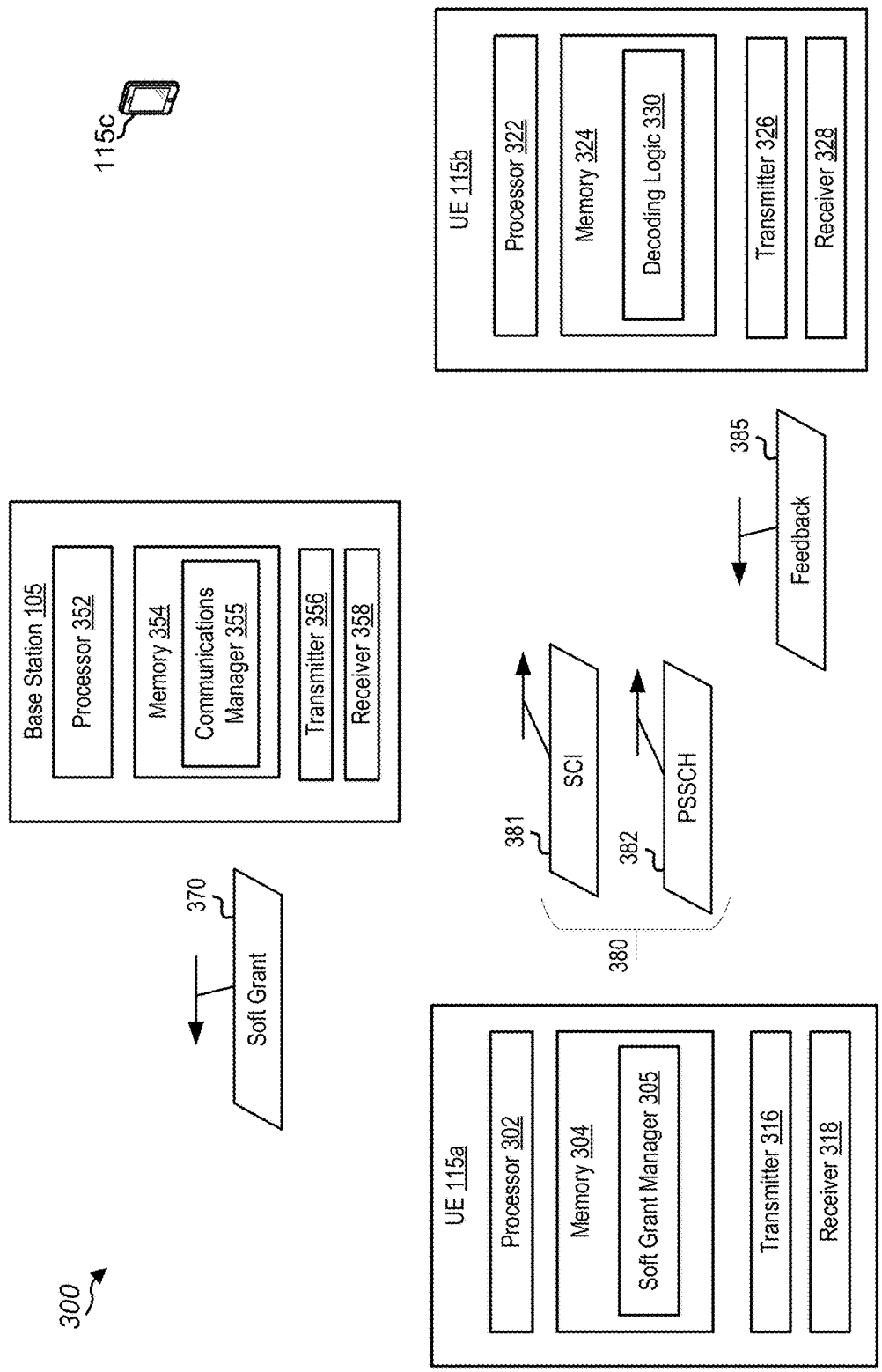
FIG. 3 is a block diagram illustrating an example wireless communication system that supports mechanisms for sharing of a sidelink resource pool using soft grants in a wireless communication system according to one or more aspects.

FIG. 3 is a block diagram of an example wireless communications system 300 that supports mechanisms for sharing of a sidelink resource pool using soft grants in a wireless communication system according to one or more aspects of the present disclosure. In some examples, wireless communications system 300 may implement aspects of wireless network 100. Wireless communications system 300 includes UE 115a, UE 115b, UE 115c, and base station 105, and may implement a sidelink communication scheme (e.g., sidelink mode 1 or sidelink mode 2). In aspects, UE 115a and UE 115b may be in communication over a sidelink. In some aspects, UE 115a and UE 115b may also each be in communication with base station 105, and may operate in sidelink mode 1. In aspects, UE 115c may operate in sidelink mode 2. In the discussion that follows, UE 115a may be described as a mode 1 transmitting UE, UE 115b may be described as a mode 1 receiving UE, and UE 115c may be described as a mode 2 UE. However, this description of UE 115a as a transmitting UE, UE 115b as a receiving UE, and UE 115c as a mode 2 UE, as well as the description of system 300 as including three UEs and one base station, is merely for illustrative purposes and not intended to be limiting in any way. As such, wireless communications system 300 may generally include additional UEs, and may include more than one base station 105.

UE 115a may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store soft grant manager 305. In aspects, soft grant manager 305 may be configured to perform operations for receiving soft grants from base station 105, for performing re-evaluation of sidelink resources indicated as soft-granted in the soft grants, and/or for upgrading soft grants to legacy grants in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105.

In some implementations, transmitter 316 and receiver 318 may be integrated in one or more transceivers. Additionally or alternatively, transmitter 316 or receiver 318 may include or correspond to one or more components of UE 115 described with reference to FIG. 2.

UE 115b also may include a variety of components (such as structural, hardware components) used for carrying out one or more functions described herein. For example, these components may include one or more processors 322 (hereinafter referred to collectively as "processor 322"), one or more memory devices 324 (hereinafter referred to collectively as "memory 324"), one or more transmitters 326 (hereinafter referred to collectively as "transmitter 326"), and one or more receivers 328 (hereinafter referred to collectively as "receiver 328"). Processor 322 may be configured to execute instructions stored in memory 324 to perform the operations described herein. In some implementations, processor 322 includes or corresponds to one or more of receive processor 258, transmit processor 264, and controller 280, and memory 324 includes or corresponds to memory 282.

Memory 324 includes or is configured to store decoding logic 330. In aspects, decoding logic 330 may be configured to decode PSSCH transmission 382 received from mode 1 transmitting UE 115b over sidelink resources granted to mode 1 transmitting UE 115b in accordance with aspects of the present disclosure.

Transmitter 326 is configured to transmit reference signals, control information and data to one or more other devices, and receiver 328 is configured to receive references signals, synchronization signals, control information and data from one or more other devices. For example, transmitter 326 may transmit signaling, control information and data to, and receiver 328 may receive signaling, control information and data from, base station 105. In some implementations, transmitter 326 and receiver 328 may be integrated in one or more transceivers. Additionally or alternatively, transmitter 326 or receiver 328 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store communications manager 355. In aspects, communications manager 355 may be configured to perform operations for configuring and/or scheduling sidelink transmissions between UE 115a and UE 115b. In aspects, configured communications manager 355 may be configured to send soft grant 370 to mode 1 transmitting UE 115a specifying resources for a sidelink data transmission to be transmitted to UE 115b, and including indications of which sidelink resources in soft grant 350 are soft-granted in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 transmits soft grant 370 to mode 1 transmitting UE 115a. In aspects, soft grant 370 may grant UE 115a a grant to transmit a sidelink transmission to mode 1 receiving UE 115b. Soft grant 350 may include a grant for one or more sidelink resources over which mode 1 transmitting UE 115a may transmit the sidelink transmission to mode 1 receiving UE 115b. For example, in aspects, soft grant 350 may include grants for a plurality of sidelink resources (e.g., up to three resource as in the case of legacy transmission grants in a DCI message or a configured grant). The soft grant may be included in a DCI message or a configured grant message transmitted from base station 105 to mode 1 transmitting UE 115a.

In aspects, soft grant 350 may include an indication that at least one sidelink resource of the one or more sidelink resources is soft granted. A soft granted sidelink resources, as used herein and as noted above, is a sidelink resource that may not be access unless a re-evaluation is performed prior to accessing, and the re-evaluation passes. A passing re-evaluation may indicate that no other sidelink UE (e.g., sidelink mode 2 UE 115c) has reserved the sidelink resource. In this manner, a soft grant of a sidelink resource is a conditional grant, in which the sidelink UE may transmit over the sidelink resource so long as the sidelink UE performs a successful re-evaluation of the sidelink resource. Otherwise, if the UE does not perform a re-evaluation, or the re-evaluation does not pass, the sidelink UE may not use, access, transmit, or receive over the sidelink resource. This is in contrast to a legacy transmission grant in which no such indication exist. In this manner, a legacy granted sidelink resource is a resource that may be accessed by the sidelink UE without having to perform a successful re-evaluation of the sidelink resource. As described below, in some aspects, a soft grant may be upgraded to a legacy grant, in which case, the soft granted resource may become a legacy granted resource, and the legacy granted resource may be accessed without a re-evaluation.

Figure 4A:
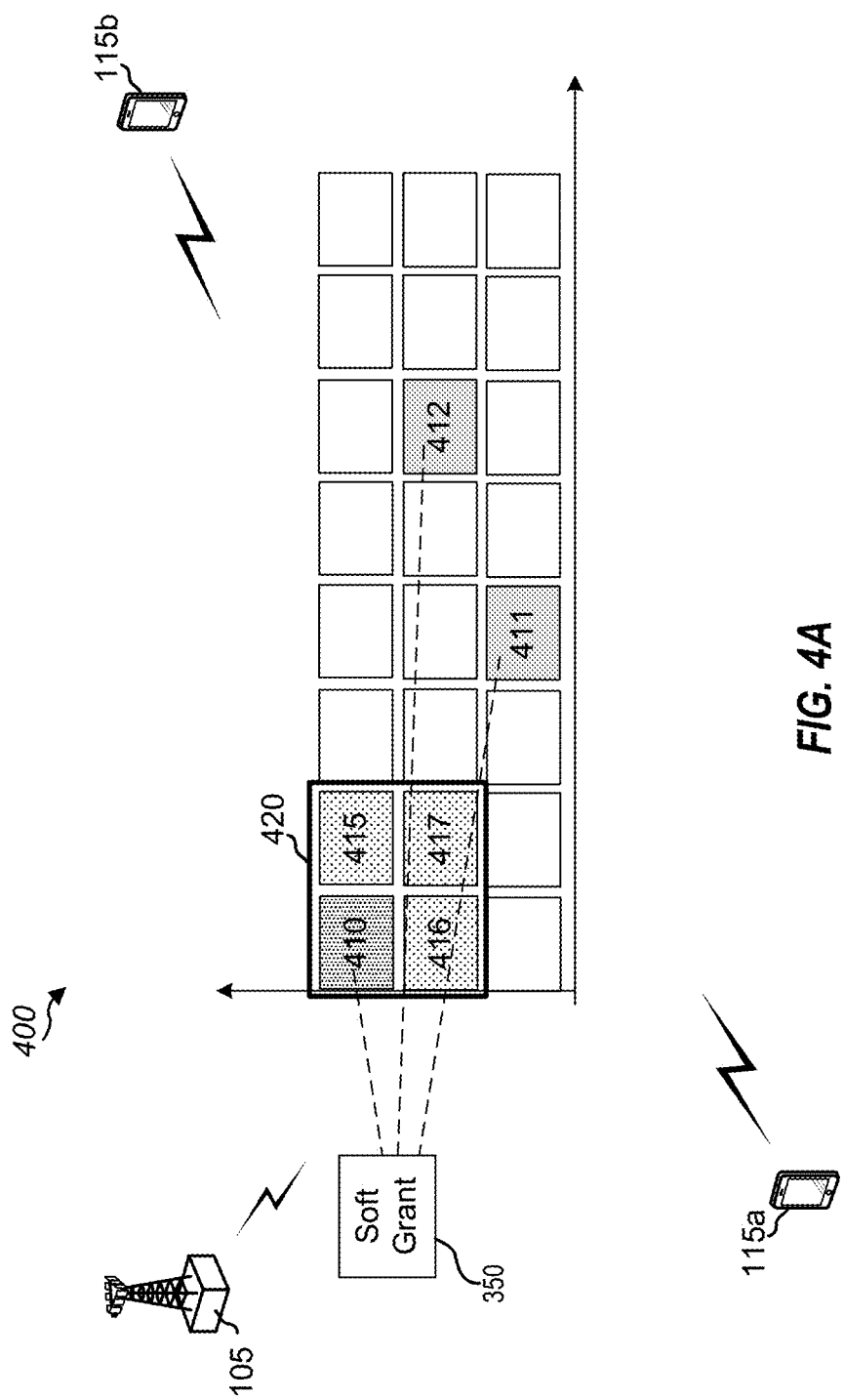
FIG. 4A is a block diagram illustrating an example of a soft grant of one or more sidelink resources in accordance with aspects of the present disclosure.

FIG. 4A is a block diagram illustrating an example of a soft grant of one or more sidelink resources in accordance with aspects of the present disclosure. As shown, base station 105 may transmit soft grant 350 to mode 1 transmitting UE 115a. In aspects, soft grant may include an indication that one or more sidelink resources granted by soft grant 350 are soft-granted sidelink resources. For example, soft grant 350 may include an indication that sidelink resource 410 is a soft-granted resource. In this example, sidelink resources 2 and 3 are not soft-granted resources, and instead are legacy granted resources. As such, mode 1 transmitting UE 115a may access sidelink resource 410 to transmit a sidelink transmission to mode 1 receiving UE 115b, as long as re-evaluation is performed and passes, but mode 1 transmitting UE 115a may access sidelink resource 411 and/or sidelink resource 412 to transmit the sidelink transmission to mode 1 receiving UE 115b without having to perform a successful re-evaluation of sidelink resources 411 and/or 412.

With reference back to FIG. 3, during operation of wireless communications system 300, mode 1 transmitting UE 115a performs a re-evaluation (e.g., a $T_3$-based re-evaluation) of the at least one sidelink resource indicate as soft-granted by soft grant 350. Mode 1 transmitting UE 115a may perform the re-evaluation prior to transmitting over the one or more sidelink resources indicated as soft-granted in order to determine whether there is a collision with another sidelink UE. For example, another sidelink UE, such as mode 2 UE 115c may have reserved the at least one sidelink indicated as soft-granted. As will be appreciated, mode 2 UE 115c may be operating in sidelink mode 2 and so it may be operating autonomously to reserve an available sidelink resource, as described above. In this case, the re-evaluation of the at least one sidelink resource performed by mode 1 transmitting UE 115a prior to transmitting to mode 1 receiving UE 115b over the one or more sidelink resources may detect the collision, and may avoid it by blocking the transmission by the mode 1 transmitting UE 115a over the at least one resource.

For example, with reference back to FIG. 4A, mode 1 transmitting UE 115a may attempt to access a sidelink resource of the sidelink resources granted by soft grant 350. In this example, mode 1 transmitting UE 115a may first attempt to access the earliest (in the time domain) sidelink resource, which in this case is sidelink resource 410, which occurs before sidelink resources 411 and 412. As sidelink resource 310 is indicated as soft-granted by soft grant 350, mode 1 transmitting UE 115a may not access sidelink resource 410 without performing a successful re-evaluation of sidelink resource 410. Mode 1 transmitting UE 115a may perform a re-evaluation of sidelink resource 410 prior to transmitting a sidelink transmission to mode 1 receiving UE 115b to determine whether sidelink resource 410 is also reserved by another sidelink UE (e.g., mode 2 UE 115c) or not. In this manner, mode 1 transmitting UE 115a may determine, prior to transmitting over soft-granted sidelink resource 410, whether there is a collision between the soft grant of sidelink resource 410 and a resource reservation of the same sidelink resource 410 from another sidelink UE operating in sidelink mode 2 (e.g., mode 2 UE 115c).

In aspects, soft grant 350 may indicate a resource selection window (SG-RSW) that may include an indication of a multi-opportunity resource set that is attached or anchored to a soft-granted sidelink resource. In aspects, the multi-opportunity resource set indication may be provided for each soft-granted sidelink resources in soft grant 350. For example, soft grant 350 may include an indication of a multi-opportunity resource set that may be attached to soft-granted resource 410 by indicating SG-RSW 420. In this case, SG-RSW 420 may include sidelink resources 415, 416, and 417, as well as soft-granted resource 410. As such, in this aspects, mode 1 transmitting UE 115a may be configured to access, when attempting to transmit the sidelink transmission to mode 1 receiving UE 115b, any of the sidelink resources in SG-RSW 420. For example, mode 1 transmitting UE 115a may perform re-evaluation to access any of sidelink resources included in SG-RSW 420. In this manner, by providing a multi-opportunity resource set, aspects of the present disclosure provide for a mechanism to reduce or suppress re-evaluation uncertainty (e.g., whether or not re-evaluation of a soft-granted sidelink resource may pass or not).

Figure 4B:
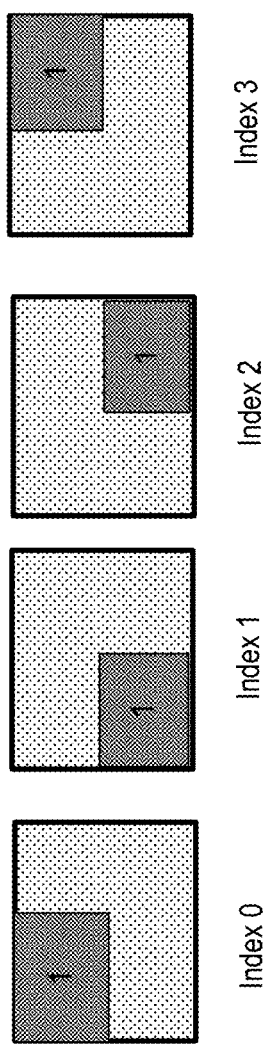
FIG. 4B is a block diagram illustrating an example of various indexes corresponding to different windowing patterns anchored to a soft-granted sidelink resource in accordance with aspects of the present disclosure.

In aspects, a SG-RSW associated with a soft granted sidelink resource may be indicated to mode 1 transmitting UE 115a as a windowing pattern with respect to the anchored soft-granted sidelink resource. In aspects, soft grant 350 may include, for one or more of the soft-granted sidelink resources, an index corresponding to a windowing pattern defining the SG-RSW associated with the respective soft granted sidelink resource. For example, one of a plurality of indexes may be used to indicate the windowing pattern. Mode 1 transmitting UE 115a may use the indicated windowing pattern to determine the SG-RSW associated with the soft granted sidelink resource and may perform re-evaluation of any of the sidelink resources within the SG-RSW as described above. FIG. 4B is a block diagram illustrating an example of various indexes corresponding to different windowing patterns anchored to a soft-granted sidelink resource in accordance with aspects of the present disclosure. For example, an indication using index 0 may indicate that the windowing pattern around soft-granted sidelink resource 1 includes a window where the soft-granted resource 1 occupies the top-left corner of the SG-RSW. In this same example, an indication using index 1 may indicate that the windowing pattern around soft-granted sidelink resource 1 includes a window where the soft-granted resource 1 occupies the bottom-left corner of the SG-RSW, an indication using index 2 may indicate that the windowing pattern around soft-granted sidelink resource 1 includes a window where the soft-granted resource 1 occupies the bottom-right corner of the SG-RSW, and an indication using index 3 may indicate that the windowing pattern around soft-granted sidelink resource 1 includes a window where the soft-granted resource 1 occupies the top-right corner of the SG-RSW. It will be appreciated that the windowing patterns illustrated in FIG. 4B, and in particular the specific patterns corresponding to each specific index, are for illustrative purposes and should not be construed as limiting in any way.

With reference back to FIG. 3, during operation of wireless system 300, mode 1 transmitting UE 115a transmits sidelink transmission 380 to mode 1 receiving UE 115b over the at least one sidelink resource in response to a determination, based on the re-evaluation of the at least one sidelink resource, that the at least one sidelink resource is not also reserved by another sidelink UE operating in mode 2 (e.g., mode 2 UE 115c). Otherwise, when the at least one sidelink resource is determined to also reserved by another sidelink UE operating in mode 2 (e.g., based on the re-evaluation of the at least one sidelink resource), mode 1 transmitting UE 115a may forgo transmitting (or may be blocked from transmitting) sidelink transmission 380 to mode 1 receiving UE 115b over the at least one sidelink resource. In this manner, mode 1 transmitting UE 115a may transmit to mode 1 receiving UE 115b over the at least one sidelink resource only when there is no collision between the soft grant of the at least one resource and a resource reservation of the at least one sidelink resource from another UE operating in sidelink mode 2. In aspects, sidelink transmission 380 may include PSSCH transmission 382 and SCI message 381. In aspects, mode 1 receiving UE 115b may transmit feedback message 385 to mode 1 transmitting UE 115a indicating either a NACK or an ACK for PSSCH transmission 382.

In aspects, mode 1 transmitting UE 115a may be configured to autonomously upgrade a soft grant for a sidelink resource to a legacy grant. In this case, after upgrading to a legacy grant, the soft-granted resource (soft-granted by the base station) may be accessed without performing a re-evaluation based on predefined rules as discussed in the following. In particular, mode 1 transmitting UE 115a may be configured to autonomously upgrade a soft grant for a sidelink resource to a legacy grant by transmitting a SCI reservation(s).

Figure 4C:
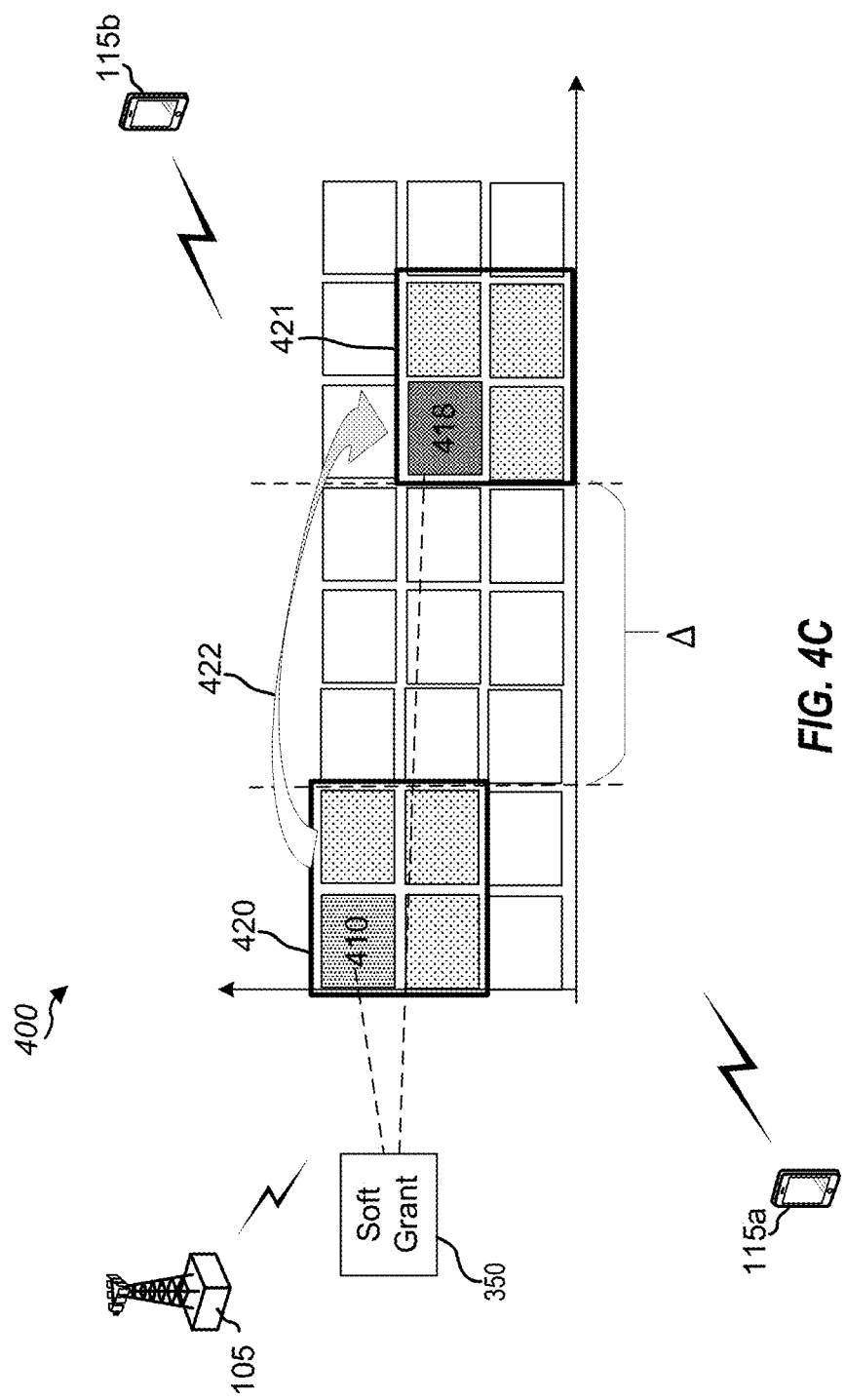
FIG. 4C is a block diagram illustrating an example of a soft grant upgrade to a legacy grant in accordance with aspects of the present disclosure.

FIG. 4C is a block diagram illustrating an example of a soft grant upgrade to a legacy grant in accordance with aspects of the present disclosure. In the example illustrated in FIG. 4C, soft grant 350 may include a soft grant of sidelink resource 410 including an indication of SG-RSW 420 anchored at soft-granted resource 410, and a soft grant of sidelink resource 418 including an indication of SG-RSW 421 anchored at soft-granted resource 418. In aspects, there may be an inter-resource time-domain gap Δ between SG-RSW 420 for soft-granted resource 410 and RSW 421 for soft-granted resource 418. In aspects, inter-resource time-domain gap Δ may be compared to a preconfigured threshold (e.g., preconfigured in L3). In aspects, the inter-resource time-domain gap Δ between SG-RSW 420 and RSW may be larger than the preconfigured threshold. In this case, mode 1 transmitting UE 115a may access a sidelink resource within SG-RS 420 for sidelink resource 410 (e.g., after performing a successful re-evaluation of a sidelink resource within SG-RS 420) and may transmit a PSSCH transmission and an SCI message to mode 1 receiving UE 115b. In this case, the SCI message may include an SCI reservation (e.g., reservation 422) reserving soft-granted sidelink resource 418. The SCI reservation of soft-granted sidelink resource 418 may upgrade the soft-grant of sidelink resource 418 to a legacy-like grant, as the sidelink resource 418 is now reserved. In some aspects, autonomous soft grant upgrading may be disabled at mode 1 transmitting UE 115a by configuring a sufficiently large preconfigured threshold. In aspects, a maximum inter-resource time-domain gap Δ may be 31.

After upgrading soft-granted sidelink resource 418 to a legacy-like granted resource via SCI reservation 422, mode 1 transmitting UE 115a may access sidelink resource 418. In aspects, accessing sidelink resource 418 may include determining whether to perform re-evaluation of sidelink resource 418, as sidelink resource 418 has been upgraded to a legacy-like granted sidelink resource. Determining whether to perform re-evaluation of sidelink resource 418 may be based on preconfigured rules. In some aspects, re-evaluation of sidelink resource 418 may be skipped when mode 1 transmitting UE 115a has reserved sidelink resource 418 using a highest priority. For example, when reservation 422 is configured with the highest priority, mode 1 transmitting UE 115a may skip re-evaluation of sidelink resource 418 before accessing sidelink resource 418. In alternative or additional aspects, re-evaluation of sidelink resource 418 may be skipped when mode 1 transmitting UE 115a has reserved sidelink resource 418 using a highest priority, and any mode 2 UE (e.g., mode 2 UE 115c) is configured to back off from a mode 1 reservation. In some aspects, and in a more general sense, a sidelink UE with a resource reservation in mode 2 may be configured to back-off from a resource reservation from a sidelink UE in mode 1 when the mode 1 reservation and the mode 2 reservation are configured with the same priority. In further alternative or additional aspects, re-evaluation of sidelink resource 418 may be skipped when mode 1 transmitting UE 115a has reserved sidelink resource 418 using a high priority, and any mode 2 UE (e.g., mode 2 UE 115c) is not permitted to use the same priority when reserving a sidelink resource. In aspects, there may be eight-levels (e.g., using an indication of 3-bits) of sidelink priorities currently defined.

In aspects, such as when soft grant upgrading is configured, mode 1 transmitting UE 115a may be configured with early ACK PUCCH resources to transmit early HARQ feedback messages to base station 105. For example, mode 1 transmitting UE 115a may be configured with an early ACK PUCCH resource after each sidelink resource granted in soft grant 350. Each of the early ACK PUCCH resource may be configured for transmitting an ACK message or a NACK message to base station 105, the ACK/NACK message associated with a TB delivery by mode 1 transmitting UE 115a. Typically, only one PUCCH resource may be configured after the last granted resource to transmit HARQ feedback with respect to a TB delivery to base station 105. However, by providing early ACK PUCCH resources, mode 1 transmitting UE may be enabled to transmit a prompt ACK with respect to the sidelink transmission over a sidelink resource. Moreover, an early ACK may also serve as an indication to base station 105 that the remaining legacy-granted sidelink resources may be now available to be allocated or granted to other sidelink UEs, as mode 1 transmitting UE may no longer need those sidelink resources.

For example, transmitting UE 115a may transmit an early ACK message to base station 105, after transmitting a sidelink transmission (e.g., PSSCH transmission 382) to mode 1 receiving UE 115b, and prior to SG-RSW 421, associated with PSSCH transmission 382. In aspects, the early ACK message indicates to base station 105 that mode 1 transmitting UE 115a successfully transmitted PSSCH transmission 382 to mode 1 receiving UE 115, and that the remaining soft-granted resource 418, which has been upgraded to a legacy granted resource, may no longer be needed by mode 1 transmitting UE 115a. In this case, base station 105 may reallocate or reschedule sidelink resource 418 to another sidelink UE (or in some cases to the same mode 1 transmitting UE 115a).

Figure 4D:
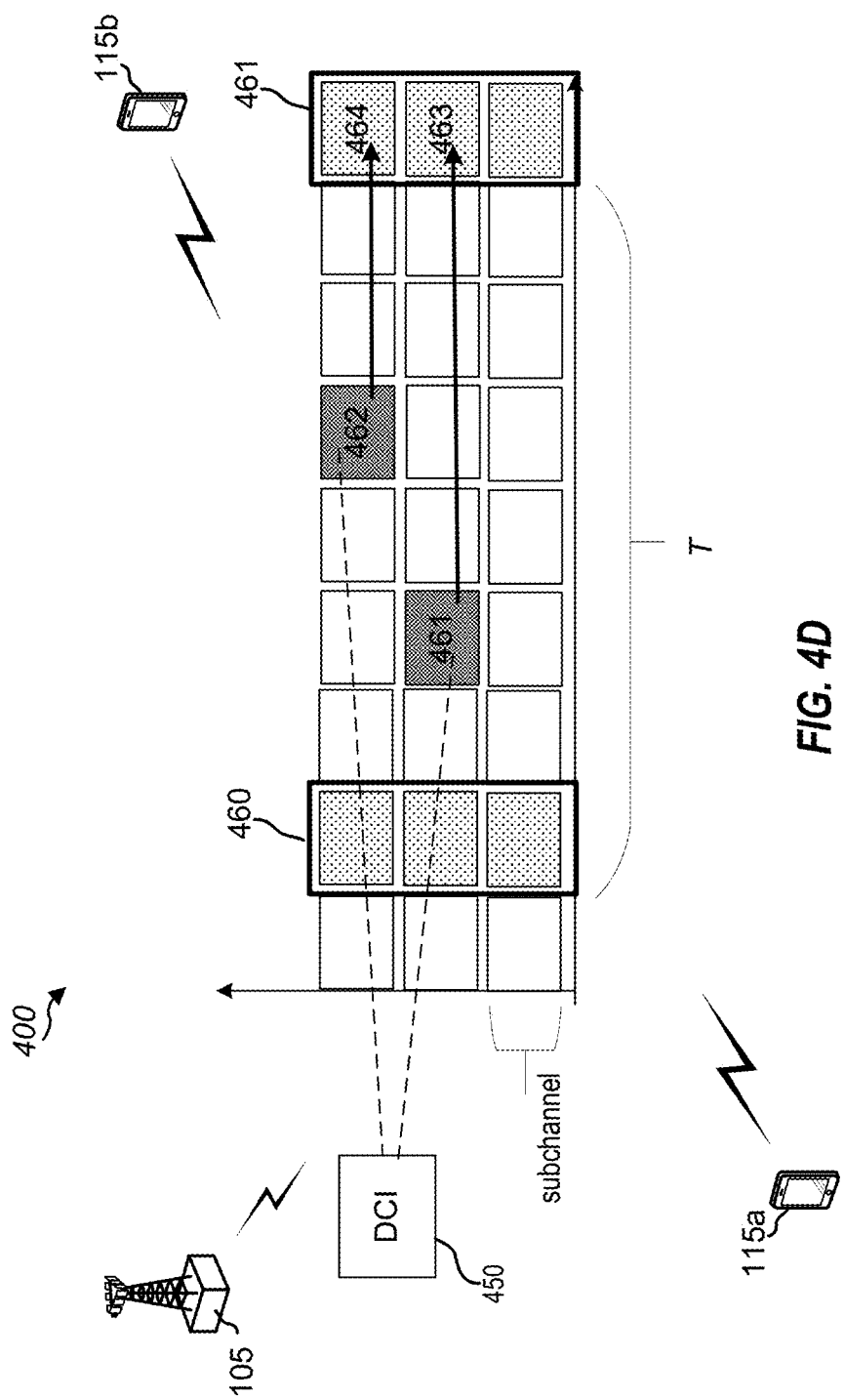
FIG. 4D is a block diagram illustrating an example of reservations using spare dynamic reservation fields in accordance with aspects of the present disclosure.

In aspects, mode 1 transmitting UE 115a may be configured to receive an indication from base station 105 to perform dynamic reservation at predefined periods or times. FIG. 4D is a block diagram illustrating an example of reservations using spare dynamic reservation fields in accordance with aspects of the present disclosure. As shown, in a resource pool supporting multiple (e.g., up to two) dynamic reservations, there may be spare dynamic reservation fields in an SCI-1 message after receiving DCI message 450 from base station 105. In aspects, mode 1 transmitting UE 115a may be indicated by base station 105 to use spare dynamic reservation fields in the SCI-1 messages to reserve resources specified at periodic intervals. For example, periodic intervals may be defined (e.g., by L3 configuration) with periodicity T. The periodic intervals may define a time 460 and a next time 461. In aspects, as shown, a spare dynamic reservation field in an SCI message transmitted over sidelink resource 461 may be used to reserve sidelink resource 463 at time 461. Similarly, a spare dynamic reservation field in an SCI message transmitted over sidelink resource 462 may be used to reserve sidelink resource 464 at time 461. By using the spare dynamic reservation fields in the SCI-1 messages to reserve resources at the periodic intervals, mode 1 transmitting UE 115a may reserve these sidelink resources without a need for an L1 time domain resource allocation (TDRA). In these aspects, mode 1 transmitting UE 115a may reserve a sidelink resource within the same subchannel granted to the current transmission, and in this case there is no need for an L1 frequency domain resource allocation. In these aspects, after receiving an early ACK from mode 1 transmitting UE 115a, base station 105 may be aware that there may be resources that may be legacy-granted at the pre-defined instants.

Figure 4E:
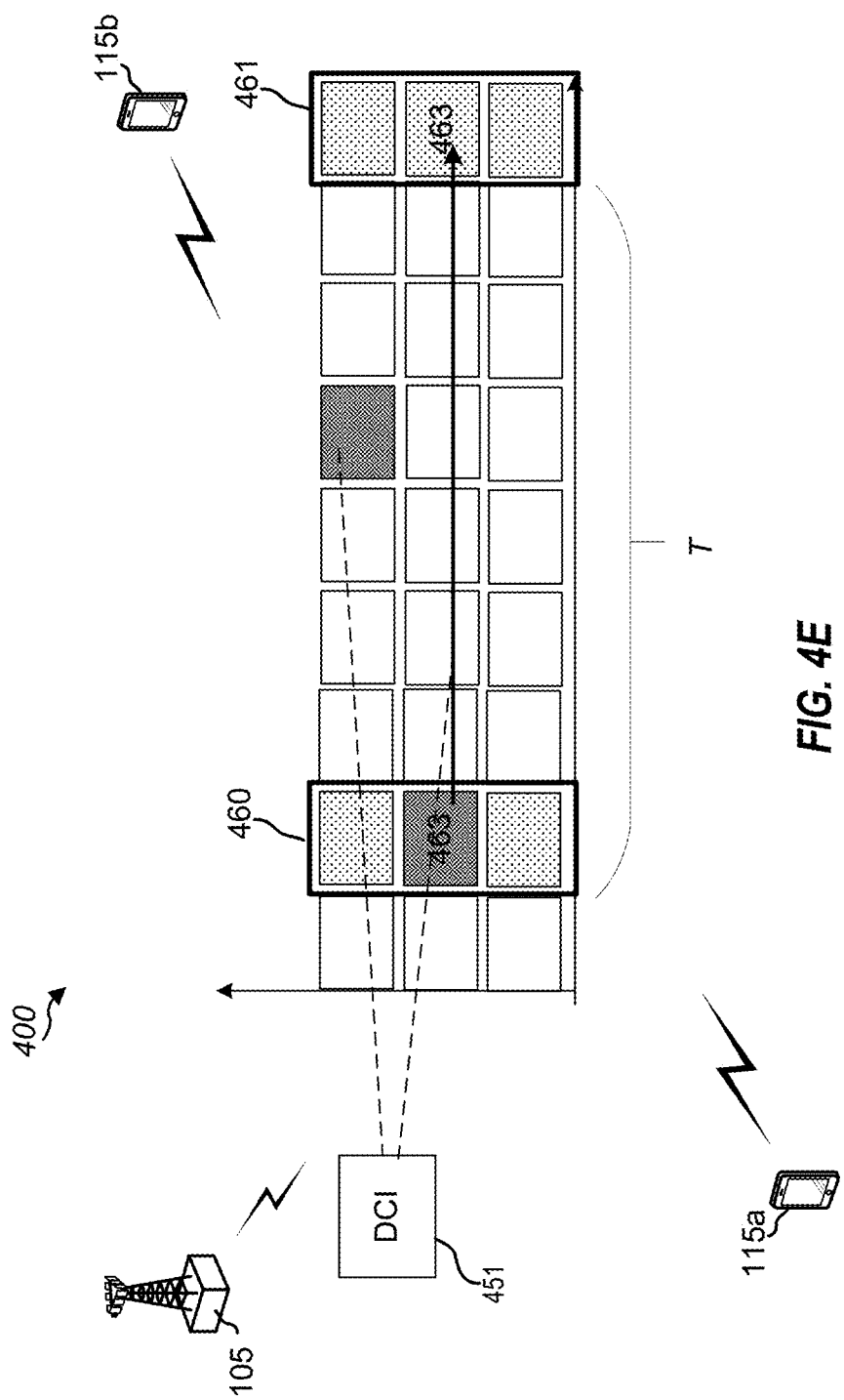
FIG. 4E is a block diagram illustrating an example of reservations using spare periodical reservation fields in accordance with aspects of the present disclosure.

In additional or alternative aspects, mode 1 transmitting UE 115a may be indicated to use a spare periodical reservation field in an SCI-1 message transmitted over a resource in a periodic interval to secure a legacy-grantable resources for the base station. FIG. 4E is a block diagram illustrating an example of reservations using spare periodical reservation fields in accordance with aspects of the present disclosure. As shown, DCI message 451 from base station 105 may be received by mode 1 transmitting UE 115a. Mode 1 transmitting UE 115a may be indicated by base station 105 to use spare periodical reservation fields in SCI-1 messages to reserve resources specified at periodic intervals. For example, DCI 451 may grant sidelink resources to mode 1 transmitting UE 115a at periodic interval 460. In aspects, periodical reservation field in an SCI message transmitted over sidelink resource 463 may be used to reserve sidelink resource 463 at periodical interval 461.

In aspects, mode 1 transmitting UE 115a may be configured to report a set of periodic reservations that mode 1 transmitting UE 115a may have detected or overheard when performing re-evaluation or additional periodical sensing of the sidelink. In aspects, mode 1 transmitting UE 115a may be configured to send the report to base station 105 periodically or based on a triggering event. For example, in aspects, mode 1 transmitting UE 115a may be configured to send the report to base station 105 in response to a determination that mode 1 transmitting UE 115a has failed to access the soft-granted resources for more than a threshold number of times over a moving time window of a number of seconds, and/or a determination that mode 1 transmitting UE 115a has observed new periodic reservations when compared to what was previously reported to base station 105 in an previous report. In aspects, base station 105 may maintain a list of sidelink UEs and/or links that may be controlled by base station 105 or already known to base station 105 in order to reduce the size of the report from mode 1 transmitting UE 115a. In aspects, base station 105 may indicate (e.g., in an L3 configuration command) the list to mode 1 transmitting UE 115a. In aspects, periodical reservations linked to any UE/link in the list may be excluded from the report by mode 1 transmitting UE 115a.

Figure 5:
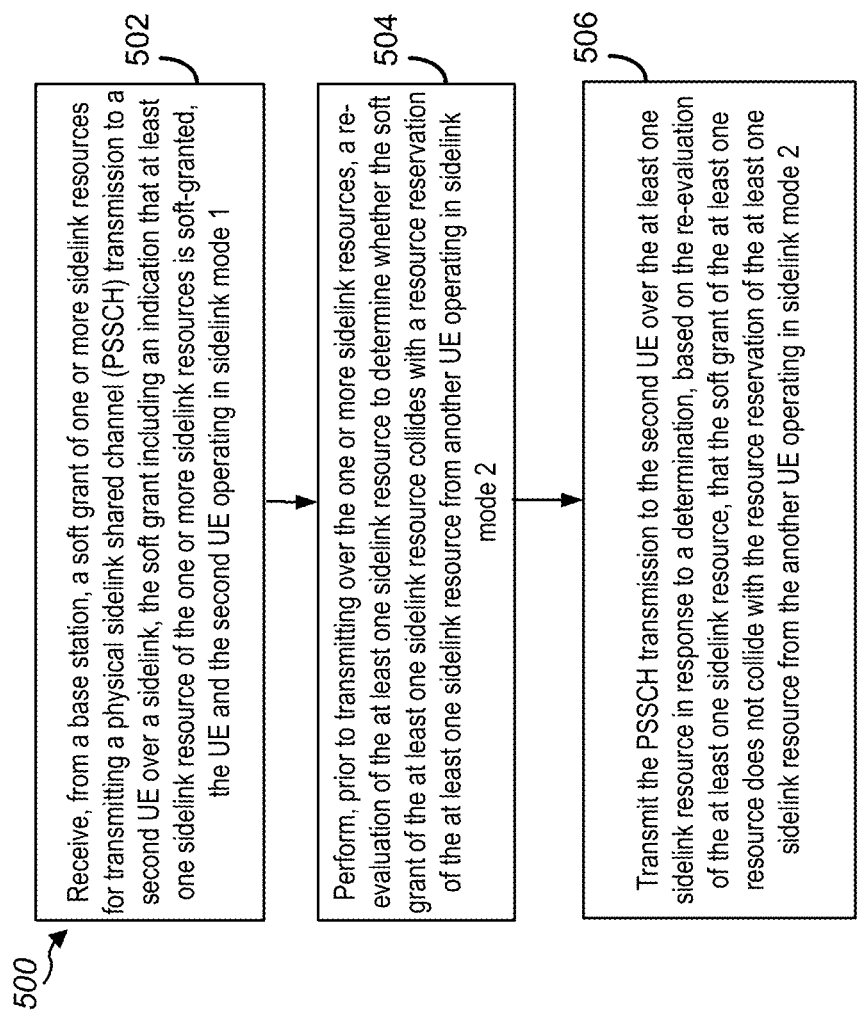
FIG. 5 is a flow diagram illustrating an example process that supports mechanisms for sharing of a sidelink resource pool using soft grants in a wireless communication system according to one or more aspects.
Figure 7:
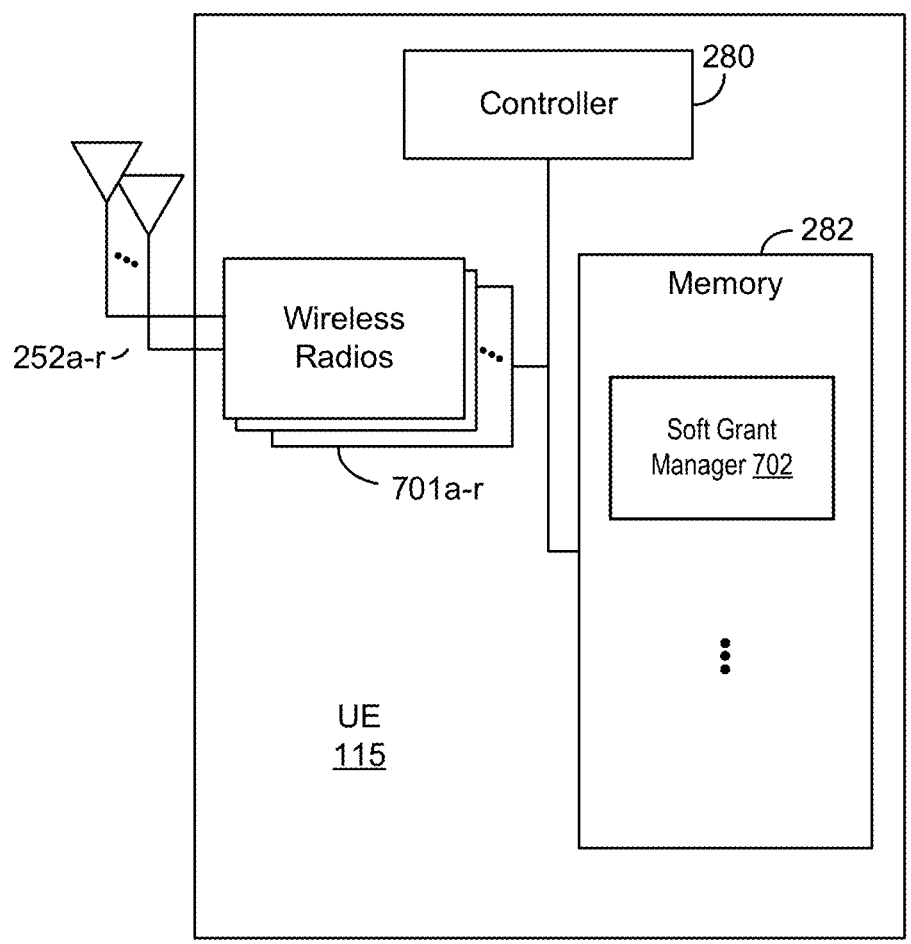
FIG. 7 is a block diagram of an example UE that supports mechanisms for sharing of a sidelink resource pool using soft grants in a wireless communication system according to one or more aspects.

FIG. 5 is a flow diagram illustrating an example process 500 that supports mechanisms for sharing of a sidelink resource pool using soft grants in a wireless communication system according to one or more aspects. Operations of process 500 may be performed by a UE, such as transmitting UE 115a described above with reference to FIGS. 1-4E. For example, example operations (also referred to as "blocks") of process 500 may enable UE 115 to support sharing a sidelink resource pool using soft grants. FIG. 7 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701a-r and antennas 252a-r. Wireless radios 701a-r includes various components and hardware, as illustrated in FIG. 2, including modulator/demodulators 254a-r, MIMO detector 256, receive processor 258, transmit processor 264, and TX MIMO processor 266.

At block 502 of process 500, a UE (e.g., UE 115) receives, from a base station (e.g., base station 105), a soft grant of one or more sidelink resources for transmitting a PSSCH transmission to a second UE over a sidelink. In aspects, the soft grant may include an indication that at least one sidelink resource of the one or more sidelink resources is soft-granted, and UE 115 and the second UE may operate in sidelink mode 1. In order to implement the functionality for such operations, UE 115, under control of controller/processor 280, may receive the soft grant from base station 105 via wireless radios 701a-r and antennas 252a-r. In aspects, UE 115 may perform operations to receive the soft grant from base station 105 according to operations and functionality as described above with reference to transmitting UE 115a and as illustrated in FIGS. 3 and 4A-4E.

At block 504 of process 500, UE 115 performs, prior to transmitting over the one or more sidelink resources, a re-evaluation of the at least one sidelink resource to determine whether the soft grant of the at least one sidelink resource collides with a resource reservation of the at least one sidelink resource from another UE operating in sidelink mode 2. In order to implement the functionality for such operations, UE 115, under control of controller/processor 280, executes soft grant manager 802, stored in memory 282. The functionality implemented through the execution environment of soft grant manager 802 allows for UE 115 to perform operations for performing a re-evaluation of the at least one sidelink resource to determine whether the soft grant of the at least one sidelink resource collides with a resource reservation of the at least one sidelink resource from another UE operating in sidelink mode 2 according to the various aspects herein. In aspects, UE 115 may perform a re-evaluation of the at least one sidelink resource to determine whether the soft grant of the at least one sidelink resource collides with a resource reservation of the at least one sidelink resource from another UE operating in sidelink mode 2 according to operations and functionality as described above with reference to transmitting UE 115a and as illustrated in FIGS. 3 and 4A-4E.

At block 506 of process 500, UE 115 transmits the PSSCH transmission to the second UE over the at least one sidelink resource in response to a determination, based on the re-evaluation of the at least one sidelink resource, that the soft grant of the at least one resource does not collide with the resource reservation of the at least one sidelink resource from the another UE operating in sidelink mode 2.

In order to implement the functionality for such operations, UE 115, under control of controller/processor 280, may transmit the PSSCH transmission to the second UE over the at least one sidelink resource via wireless radios 701*a-r* and antennas 252*a-r*. In aspects, UE 115 may perform operations to transmit the PSSCH transmission to the second UE over the at least one sidelink resource in response to a determination, based on the re-evaluation of the at least one sidelink resource, that the soft grant of the at least one resource does not collide with the resource reservation of the at least one sidelink resource from the another UE operating in sidelink mode 2 according to operations and functionality as described above with reference to transmitting UE 115*a* and as illustrated in FIGS. 3 and 4A-4E.

Figure 6:
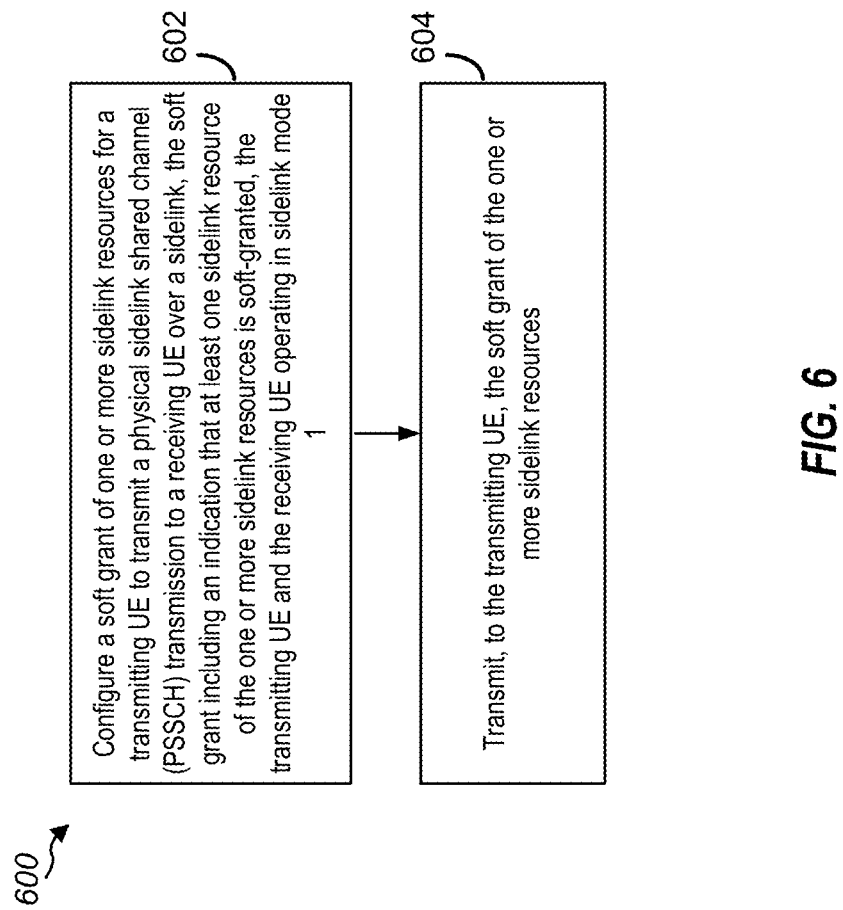
FIG. 6 is a flow diagram illustrating an example process that supports mechanisms for sharing of a sidelink resource pool using soft grants in a wireless communication system according to one or more aspects.
Figure 8:
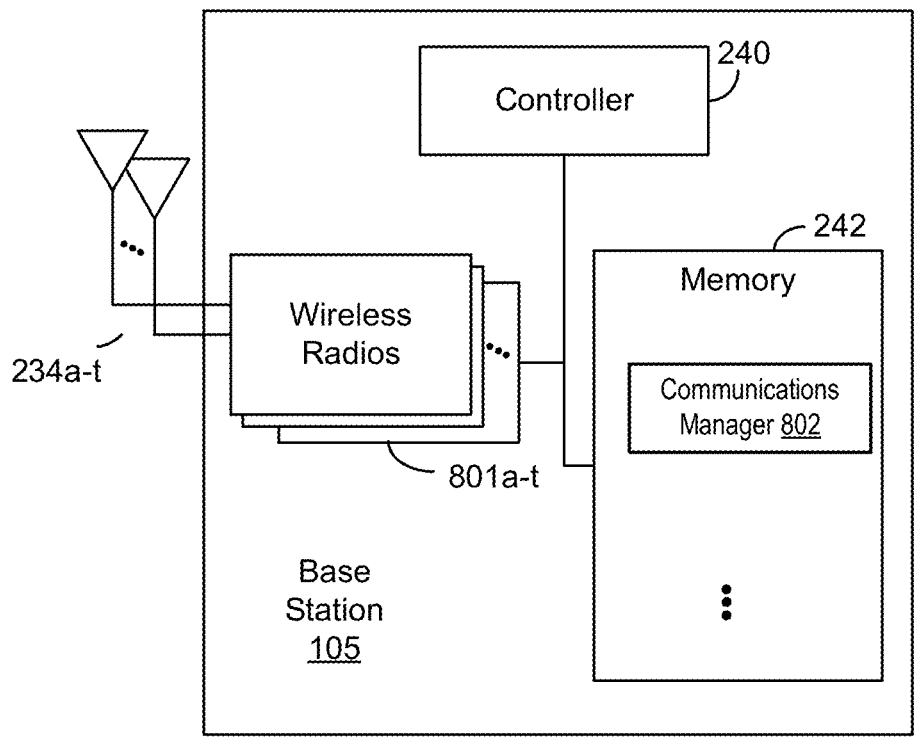
FIG. 8 is a block diagram of an example base station that supports according to one or more aspects.

FIG. 6 is a block diagram illustrating an example an example process 600 that provides for sharing of a sidelink resource pool using soft grants in a wireless communication system according to one or more aspects according to one or more aspects. Operations of process 600 may be performed by a base station, such as base station 105 described above with reference to FIGS. 1-4E, or described with reference to FIG. 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 801*a-t* and antennas 234*a-t*. Wireless radios 801*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 602 of process 600, a base station (e.g., base station 105) configures a soft grant of one or more sidelink resources for a transmitting UE to transmit a PSSCH transmission to a receiving UE over a sidelink. In aspects, the soft grant may include an indication that at least one sidelink resource of the one or more sidelink resources is soft-granted, and the transmitting UE and the receiving UE may be operating in sidelink mode 1. In order to implement the functionality for such operations, base station 105, under control of controller/processor 240, executes communications manager 802, stored in memory 242. The functionality implemented through the execution environment of communications manager 802 allows for base station 105 to perform operations to configure a soft grant of one or more sidelink resources for a transmitting UE to transmit a PSSCH transmission to a receiving UE over a sidelink according to the various aspects herein. In aspects, base station 105 may perform operations to configure a soft grant of one or more sidelink resources for a transmitting UE to transmit a PSSCH transmission to a receiving UE over a sidelink according to operations and functionality as described above with reference to base station 105 and as illustrated in FIGS. 3 and 4A-4E.

At block 604 of process 600, base station 105 transmits, to the transmitting UE, the soft grant of the one or more sidelink resources. In order to implement the functionality for such operations, the base station, under control of controller/processor 240, transmits the soft grant of the one or more sidelink resources to the transmitting UE via wireless radios 801*a-r* and antennas 234*a-t*. In aspects, base station 105 may perform operations to transmit the soft grant of the one or more sidelink resources to the transmitting UE according to operations and functionality as described above with reference to base station 105 and as illustrated in FIGS. 3 and 4A-4E.

In one or more aspects, techniques for supporting mechanisms for sharing of a sidelink resource pool using soft grants in a wireless communication system according to one or more aspects may include additional aspects, such as any single aspect or any combination of aspects described below or in connection with one or more other processes or devices described elsewhere herein. In a first aspect, supporting sharing of a sidelink resource pool using soft grants in a wireless communication system may include an apparatus configured to receive, from a base station, a soft grant of one or more sidelink resources for transmitting a PSSCH transmission to a second UE over a sidelink. In this aspect, the soft grant includes an indication that at least one sidelink resource of the one or more sidelink resources is soft-granted, and the UE and the second UE operate in sidelink mode 1. The apparatus is further configured to perform, prior to transmitting over the one or more sidelink resources, a re-evaluation of the at least one sidelink resource to determine whether the soft grant of the at least one sidelink resource collides with a resource reservation of the at least one sidelink resource from another UE operating in sidelink mode 2, and to transmit the PSSCH transmission to the second UE over the at least one sidelink resource in response to a determination, based on the re-evaluation of the at least one sidelink resource, that the soft grant of the at least one resource does not collide with the resource reservation of the at least one sidelink resource from the another UE operating in sidelink mode 2. Additionally, the apparatus may perform or operate according to one or more aspects as described below. In some implementations, the apparatus includes a wireless device, such as a UE (e.g., a transmitting UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the indication that the at least one sidelink resource of the one or more sidelink resources is soft-granted indicates that re-evaluation is required to be performed before accessing the at least one sidelink resource.

In a third aspect, alone or in combination with one or more of the first aspect or the second aspect, the soft grant of the one or more sidelink resources includes a configuration of a sensing window for the UE to perform re-evaluation of the at least one sidelink resource.

In a fourth aspect, alone or in combination with one or more of the first aspect through the third aspect, at least one sidelink resource of the one or more sidelink resources is legacy-granted.

In a fifth aspect, alone or in combination with one or more of the first aspect through the fourth aspect, the soft grant of the one or more sidelink resources includes an indication of a resource selection window including a multi-opportunity resource set associated with the at least one sidelink resource, the multi-opportunity resource set including a plurality of resources.

In a sixth aspect, alone or in combination with one or more of the first aspect through the fifth aspect, performing the re-evaluation of the at least one sidelink resource includes performing a re-evaluation of any sidelink resource of the plurality of resources.

In a seventh aspect, alone or in combination with one or more of the first aspect through the sixth aspect, the indication of the resource selection window includes an index to a windowing pattern anchored to the at least one sidelink resource.

In an eighth aspect, alone or in combination with one or more of the first aspect through the seventh aspect, the techniques of the first aspect include upgrading at least one soft grant of the soft grant of the at least one sidelink resource to a legacy grant.

In a ninth aspect, alone or in combination with one or more of the first aspect through the eighth aspect, upgrading the at least one soft grant of the soft grant of the at least one sidelink resource to a legacy grant includes transmitting at least one SCI message including a reservation of the at least one soft grant.

In a tenth aspect, alone or in combination with one or more of the first aspect through the ninth aspect, upgrading the at least one soft grant of the soft grant of the at least one sidelink resource to a legacy grant is based on a predetermined upgrading rule.

In an eleventh aspect, alone or in combination with one or more of the first aspect through the tenth aspect, the at least one soft grant includes a first soft grant granting a first sidelink resource of the at least one sidelink resource and a second soft grant granting a second sidelink resource of the at least one sidelink resource.

In a twelfth aspect, alone or in combination with the eleventh aspect, upgrading the at least one soft grant to a legacy grant includes upgrading the second soft grant to a legacy grant in response to successfully transmitting the PSSCH transmission over the first sidelink resource.

In a thirteenth aspect, alone or in combination with one or more of the first aspect through the twelfth aspect, the techniques of the first aspect include foregoing performing re-evaluation of the second sidelink resource in response to upgrading the second soft grant to a legacy grant.

In a fourteenth aspect, alone or in combination with one or more of the first aspect through the thirteenth aspect, foregoing performing re-evaluation of the second sidelink resource is further in response to a determination that the UE is configured to reserve the second sidelink resource with a highest priority, a determination that the UE is configured to reserve the second sidelink resource with a highest priority and the another UE operating in sidelink mode 2 is configured to back off from sidelink mode 1 resource reservation with the highest priority, and/or a determination that the UE is configured to reserve the second sidelink resource with a priority that the another UE operating in mode 2 is not allowed to use when reserving a sidelink resource.

In a fifteenth aspect, alone or in combination with one or more of the first aspect through the fourteenth aspect, the UE is configured with an early ACK resource for transmitting an ACK message or a NACK message to the base station after each sidelink resource of the at least one sidelink resource.

In a sixteenth aspect, alone or in combination with one or more of the first aspect through the fifteenth aspect, the techniques of the first aspect include transmitting an ACK message in a first early ACK resource associated with a first sidelink resource of the at least one sidelink resource over which the PSSCH transmission is transmitted, the ACK message in the first early ACK resource indicating to the base station that sidelink resources of the at least one sidelink resource occurring subsequent to the first sidelink resource are available to be granted to other sidelink UEs.

In a seventeenth aspect, alone or in combination with one or more of the first aspect through the sixteenth aspect, the soft grant includes an indication for the UE to perform dynamic reservation.

In an eighteenth aspect, alone or in combination with the seventeenth aspect, the UE performs dynamic reservation by including a reservation indication in a reservation field of a SCI message, the reservation indication reserving a sidelink resource within a subchannel of a current sidelink resource granted in the soft grant.

In a nineteenth aspect, alone or in combination with one or more of the first aspect through the eighteenth aspect, the techniques of the first aspect include detecting, based on the re-evaluation or periodic sensing of the sidelink, at least one periodic reservation of a sidelink resource.

In a twentieth aspect, alone or in combination with the nineteenth aspect, the techniques of the first aspect include including the detected at least one periodic reservation to a set of periodic reservations.

In a twenty-first aspect, techniques for supporting mechanisms for sharing a sidelink resource pool using soft grants in a wireless communication system may include an apparatus configured to configure a soft grant of one or more sidelink resources for a transmitting UE to transmit a PSSCH transmission to a receiving UE over a sidelink. In this aspect, the soft grant includes an indication that at least one sidelink resource of the one or more sidelink resources is soft-granted, and the transmitting UE and the receiving UE operate in sidelink mode 1. In this aspect, the apparatus is further configured to transmit, to the transmitting UE, the soft grant of the one or more sidelink resources. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-second aspect, alone or in combination with the twenty-first aspect, the indication that the at least one sidelink resource of the one or more sidelink resources is soft-granted indicates that re-evaluation is required to be performed by the transmitting UE before accessing the at least one sidelink resource.

In a twenty-third aspect, alone or in combination with one or more of the twenty-first aspect through the twenty-second aspect, the soft grant of the one or more sidelink resources includes a configuration of a sensing window for the UE to perform re-evaluation of the at least one sidelink resource.

In a twenty-fourth aspect, alone or in combination with one or more of the twenty-first aspect through the twenty-third aspect, at least one sidelink resource of the one or more sidelink resources is legacy-granted.

In a twenty-fifth aspect, alone or in combination with one or more of the twenty-first aspect through the twenty-fourth aspect, configuring the soft grant of the one or more sidelink resources includes configuring and a resource selection window including a multi-opportunity resource set associated with the at least one sidelink resource, the multi-opportunity resource set including a plurality of resources.

In a twenty-sixth aspect, alone or in combination with the twenty-fifth aspect, configuring the soft grant of the one or more sidelink resources includes transmitting, to the transmitting UE, an indication of the resource selection window.

In a twenty-seventh aspect, alone or in combination with one or more of the twenty-first aspect through the twenty-sixth aspect, the transmitting UE is configured to perform a re-evaluation of any sidelink resource of the plurality of resources.

In a twenty-eighth aspect, alone or in combination with one or more of the twenty-first aspect through the twenty-seventh aspect, the indication of the resource selection window includes an index to a windowing pattern anchored to the at least one sidelink resource.

In a twenty-ninth aspect, alone or in combination with one or more of the twenty-first aspect through the twenty-eighth aspect, the techniques of the twenty-first aspect include configuring the transmitting UE with early ACK resource for transmitting an ACK message or a NACK message to the base station after each sidelink resource of the at least one sidelink resource.

In a thirtieth aspect, alone or in combination with one or more of the twenty-first aspect through the twenty-ninth aspect, the techniques of the twenty-first aspect include receiving, from the transmitting UE, an ACK message in a first early ACK resource associated with a first sidelink resource of the at least one sidelink resource over which the PSSCH transmission is transmitted, the ACK message in the first early ACK resource indicating to the base station that sidelink resources of the at least one sidelink resource occurring subsequent to the first sidelink resource are available to be granted to other sidelink UEs.

In a thirty-first aspect, alone or in combination with one or more of the twenty-first aspect through the thirtieth aspect, the soft grant includes an indication for the UE to perform dynamic reservation.

In a thirty-second aspect, alone or in combination with the thirty-first aspect, the UE performs dynamic reservation by including a reservation indication in a reservation field of a SCI message, the reservation indication reserving a sidelink resource within a subchannel of a current sidelink resource granted in the soft grant.

In a thirty-third aspect, alone or in combination with one or more of the twenty-first aspect through the thirty-second aspect, the techniques of the twenty-first aspect include receiving, from the transmitting UE, a report of a set of periodic reservations, the set of periodic reservations including periodic reservations detected by the transmitting UE based on the re-evaluation or periodic sensing of the sidelink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
receiving, from a base station, a sidelink mode 1 resource grant of one or more sidelink resources for scheduling a physical sidelink shared channel (PSSCH) transmission to a second UE over the one or more sidelink resources in a sidelink, the sidelink mode 1 resource grant including a soft grant of at least one sidelink resource of the one or more sidelink resources, the soft grant including an indication that the at least one sidelink resource of the one or more sidelink resources is soft-granted for operation of the UE and the second UE in sidelink mode 1;

performing, prior to transmitting over the one or more sidelink resources, a re-evaluation of the at least one sidelink resource to determine whether the soft grant of the at least one sidelink resource collides with a resource reservation of the at least one sidelink resource from another UE operating in sidelink mode 2;

transmitting the PSSCH transmission to the second UE over the at least one sidelink resource in response to a determination, based on the re-evaluation of the at least one sidelink resource, that the soft grant of the at least one sidelink resource does not collide with the resource reservation of the at least one sidelink resource from the another UE operating in sidelink mode 2; and upgrading at least one soft grant of the soft grant of the at least one sidelink resource to a legacy grant, wherein upgrading the at least one soft grant of the soft grant of the at least one sidelink resource to a legacy grant is based on a predetermined upgrading rule.

2. The method of claim 1, wherein the indication that the at least one sidelink resource of the one or more sidelink resources is soft-granted indicates that re-evaluation is required to be performed before accessing the at least one sidelink resource.

3. The method of claim 1, wherein the soft grant of the at least one sidelink resource includes a configuration of a sensing window for the UE to perform the re-evaluation of the at least one sidelink resource.

4. The method of claim 1, wherein at least one sidelink resource of the one or more sidelink resources is legacy-granted.

5. The method of claim 1, wherein the soft grant of the at least one sidelink resource includes an indication of a resource selection window including a multi-opportunity resource set associated with the at least one sidelink resource, the multi-opportunity resource set including a plurality of resources.

6. The method of claim 5, wherein performing the re-evaluation of the at least one sidelink resource includes performing a re-evaluation of any sidelink resource of the multi-opportunity resource set.

7. The method of claim 5, wherein the indication of the resource selection window includes an index to a windowing pattern anchored to the at least one sidelink resource.

8. The method of claim 1, wherein upgrading the at least one soft grant of the soft grant of the at least one sidelink resource to a legacy grant includes transmitting at least one sidelink control information (SCI) message including a reservation of the at least one soft grant.

9. The method of claim 1, wherein the at least one soft grant includes a first soft grant granting a first sidelink resource of the at least one sidelink resource and a second soft grant granting a second sidelink resource of the at least one sidelink resource, and wherein upgrading the at least one soft grant to a legacy grant includes:

upgrading the second soft grant to a legacy grant in response to successfully transmitting the PSSCH transmission over the first sidelink resource.

10. The method of claim 9, further comprising:
foregoing performing re-evaluation of the second sidelink resource in response to upgrading the second soft grant to a legacy grant.

11. The method of claim 9, wherein foregoing performing re-evaluation of the second sidelink resource is further in response to one or more of:

a determination that the UE is configured to reserve the second sidelink resource with a highest priority;

a determination that the UE is configured to reserve the second sidelink resource with a highest priority and the another UE operating in sidelink mode 2 is configured to back off from sidelink mode 1 resource reservation with the highest priority; and a determination that the UE is configured to reserve the second sidelink resource with a priority that the another UE operating in mode 2 is not allowed to use when reserving a sidelink resource.

12. The method of claim 1, wherein the UE is configured with an early acknowledgement (ACK) resource for transmitting an ACK message or a negative ACK (NACK) message to the base station after each sidelink resource of the at least one sidelink resource.

13. The method of claim 12, further comprising:
transmitting an ACK message in a first early ACK resource associated with a first sidelink resource of the at least one sidelink resource over which the PSSCH transmission is transmitted, the ACK message in the first early ACK resource indicating to the base station that sidelink resources of the at least one sidelink resource occurring subsequent to the first sidelink resource are available to be granted to other sidelink UEs.

14. The method of claim 1, wherein the soft grant includes an indication for the UE to perform dynamic reservation, wherein the UE performs dynamic reservation by:

including a reservation indication in a reservation field of a sidelink control information (SCI) message, the reservation indication reserving a sidelink resource within a subchannel of a current sidelink resource granted in the soft grant.

15. The method of claim 1, further comprising:
detecting, based on the re-evaluation or periodic sensing of the sidelink, at least one periodic reservation of a sidelink resource in which the sidelink resource is reserved at periodic intervals;

including the detected at least one periodic reservation to a set of periodic reservations; and reporting the set of periodic reservations to the base station.

16. A method of wireless communication performed by a base station, the method comprising:

configuring a sidelink mode 1 resource grant of one or more sidelink resources for scheduling a transmitting user equipment (UE) to transmit a physical sidelink shared channel (PSSCH) transmission to a receiving UE over the one or more sidelink resources in a sidelink, the sidelink mode 1 resource grant including a soft grant of at least one sidelink resource of the one or more sidelink resources, the soft grant including an indication that the at least one sidelink resource of the one or more sidelink resources is soft-granted for operation of the transmitting UE and the receiving UE in sidelink mode 1;

transmitting, to the transmitting UE, the sidelink mode 1 resource grant including the soft grant of the one or more sidelink resources;

configuring the transmitting UE with an early acknowledgement (ACK) resource for transmitting an ACK message or a negative ACK (NACK) message to the base station after each sidelink resource of the at least one sidelink resource; and receiving, from the transmitting UE, an ACK message in a first early ACK resource associated with a first sidelink resource of the at least one sidelink resource over which the PSSCH transmission is transmitted, the ACK message in the first early ACK resource indicating to the base station that sidelink resources of the at least one sidelink resource occurring subsequent to the first sidelink resource are available to be granted to other sidelink UEs.

17. The method of claim 16, wherein the indication that the at least one sidelink resource of the one or more sidelink resources is soft-granted indicates that re-evaluation is required to be performed by the transmitting UE before accessing the at least one sidelink resource.

18. The method of claim 16, wherein the soft grant of the at least one sidelink resource includes a configuration of a sensing window for the UE to perform re-evaluation of the at least one sidelink resource.

19. The method of claim 16, wherein at least one sidelink resource of the one or more sidelink resources is legacy-granted.

20. The method of claim 16, wherein configuring the sidelink mode 1 resource grant including the soft grant of the at least one sidelink resource includes:
configuring and a resource selection window including a multi-opportunity resource set associated with the at least one sidelink resource, the multi-opportunity resource set including a plurality of resources; and
transmitting, to the transmitting UE, an indication of the resource selection window.

21. The method of claim 20, wherein the transmitting UE is configured to perform a re-evaluation of any sidelink resource of the multi-opportunity resource set.

22. The method of claim 20, wherein the indication of the resource selection window includes an index to a windowing pattern anchored to the at least one sidelink resource.

23. The method of claim 16, wherein the soft grant includes an indication for the UE to perform dynamic reservation, wherein the UE performs dynamic reservation by:
including a reservation indication in a reservation field of a sidelink control information (SCI) message, the reservation indication reserving a sidelink resource within a subchannel of a current sidelink resource granted in the soft grant.

24. The method of claim 16, further comprising:
receiving, from the transmitting UE, a report of a set of periodic reservations, the set of periodic reservations including at least one periodic reservation of a sidelink resource in which the sidelink resource is reserved at periodic intervals detected by the transmitting UE based on a re-evaluation or periodic sensing of the sidelink.

25. A user equipment (UE) comprising:
a processing system that includes at least one processor and one or more memories coupled to the one or more processors, the at least one processor configured to execute processor-readable code to cause the UE to:
receive, from a base station, a sidelink mode 1 resource grant of one or more sidelink resources for scheduling a physical sidelink shared channel (PSSCH) transmission to a second UE over the one or more sidelink resources in a sidelink, the sidelink mode 1 resource grant including a soft grant of at least one sidelink resource of the one or more sidelink resources, the soft grant including an indication that the at least one sidelink resource of the one or more sidelink resources is soft-granted for operation of the UE and the second UE in sidelink mode 1;

perform, prior to transmitting over the one or more sidelink resources, a re-evaluation of the at least one sidelink resource to determine whether the soft grant of the at least one sidelink resource collides with a resource reservation of the at least one sidelink resource from another UE operating in sidelink mode 2;

transmit the PSSCH transmission to the second UE over the at least one sidelink resource in response to a determination, based on the re-evaluation of the at least one sidelink resource, that the soft grant of the at least one sidelink resource does not collide with the resource reservation of the at least one sidelink resource from the another UE operating in sidelink mode 2; and upgrade at least one soft grant of the soft grant of the at least one sidelink resource to a legacy grant, wherein upgrading the at least one soft grant of the soft grant of the at least one sidelink resource to a legacy grant is based on a predetermined upgrading rule.

26. A base station comprising:
a processing system that includes at least one processor and one or more memories coupled to the one or more processors, the at least one processor configured to execute processor-readable code to cause the base station to:
configure a sidelink mode 1 resource grant of one or more sidelink resources for scheduling a transmitting UE to transmit a physical sidelink shared channel (PSSCH) transmission to a receiving UE over the one or more sidelink resources of a sidelink, the sidelink mode 1 resource grant including a soft grant of at least one sidelink resource of the one or more sidelink resources, the soft grant including an indication that the at least one sidelink resource of the one or more sidelink resources is soft-granted for operation of the transmitting UE and the receiving UE in sidelink mode 1;
transmit, to the transmitting UE, the sidelink mode 1 resource grant including the soft grant of the one or more sidelink resources;
configure the transmitting UE with an early acknowledgement (ACK) resource for transmitting an ACK message or a negative ACK (NACK) message to the base station after each sidelink resource of the at least one sidelink resource; and
receive, from the transmitting UE, an ACK message in a first early ACK resource associated with a first sidelink resource of the at least one sidelink resource over which the PSSCH transmission is transmitted, the ACK message in the first early ACK resource indicating to the base station that sidelink resources of the at least one sidelink resource occurring subsequent to the first sidelink resource are available to be granted to other sidelink UEs.

* * * * *